United States Patent [19]
Tedesco

[11] Patent Number: 5,861,990
[45] Date of Patent: Jan. 19, 1999

[54] COMBINED OPTICAL DIFFUSER AND LIGHT CONCENTRATOR

[75] Inventor: James M. Tedesco, Livonia, Mich.

[73] Assignee: Kaiser Optical Systems, Ann Arbor, Mich.

[21] Appl. No.: 613,083

[22] Filed: Mar. 8, 1996

[51] Int. Cl.$^6$ .............. G02B 13/14; G02B 5/02; G02B 5/08
[52] U.S. Cl. .............. 359/599; 359/608; 362/355; 362/360; 362/361
[58] Field of Search .............. 359/599, 608; 362/355, 360, 361

[56] References Cited

U.S. PATENT DOCUMENTS

| | | | |
|---|---|---|---|
| 734,020 | 7/1903 | Wadsworth | 359/594 |
| 3,527,151 | 9/1970 | Harrison | 359/599 |
| 5,048,925 | 9/1991 | Gerritsen et al. | 359/569 |
| 5,365,354 | 11/1994 | Jannson et al. | 359/15 |
| 5,381,309 | 1/1995 | Borchardt | 362/31 |

FOREIGN PATENT DOCUMENTS

| | | | |
|---|---|---|---|
| 0235102 | 11/1985 | Japan | 359/599 |
| 404146401 | 5/1992 | Japan | 359/599 |
| 406094904 | 4/1994 | Japan | 359/599 |
| 40614808 | 5/1994 | Japan | 359/599 |

*Primary Examiner*—Cassandra C. Spyrou
*Assistant Examiner*—Mohammad Y. Sikder
*Attorney, Agent, or Firm*—Gifford,Krass,Groh,Sprinkle,Patmore,Anderson&Citkowski

[57] ABSTRACT

A combined optical diffuser and light concentrator uses a layer of optically transmissive material having a first surface to receive light at a range of angles of incidence and a second surface from which the light emerges at a range of angles of emergence, the second surface including a relief pattern featuring a multiplicity of minute projections, the shape and distribution of the projections resulting in diffused light at a range of angles of emergence narrower than the range of angles of incidence. The projections may be produced in accordance with various techniques, including the processing of a photoresist layer exposed to a random speckle pattern or microlithography, including e-beam/x-ray sources.

5 Claims, 5 Drawing Sheets

COMBINED OPTICAL DIFFUSER AND LIGHT CONCENTRATOR

FIELD OF THE INVENTION

The present invention relates generally to optical diffusers and, in particular, to a material capable of simultaneously performing both a light-diffusing function and a light-concentrating function.

BACKGROUND OF THE INVENTION

There exists a need for an optical material capable of both light diffusion and concentration of the diffused light to provide a brighter, though narrower field of view. Such a device would be useful, for example, in a backlighting arrangement for a flat-panel display such as a liquid-crystal (LCD) display. Light diffusers are now common in such backlighting configurations, where they convert light from lamp segments or discrete sources into a more uniform glow across the surface of the display. By their very nature, however, to obscure the light source(s) and cause their shape to be less visually apparent, such diffusers panels redirect incident radiation into multiple output rays which assist in filling the gaps otherwise visible between the discrete sources. This results in a more or less uniform illumination of the display screen, but over a relatively wide range of viewing angles.

If it is known that a narrower range of viewing angles will be used, however, it may be advantageous to concentrate the diffused light into a narrower range of output angles. Representative applications include aircraft and automotive instrumentation, wherein the relative position between the display and the viewer may be substantially fixed. Even in computer display and television viewing environments, however, it may be desirable to reduce or eliminate extremely wide viewing angles in favor of concentrating more light directly in front of the screen. Indeed, in portable computer applications, concentrating light most toward the operator provides a certain level of security by preventing others from being able to view what might be sensitive data.

Concentration of diffused light may be accomplished with several techniques, including the addition of a second, focusing element disposed between the diffuser and the back side of the display panel. Brightness enhancement film (BEF) available from 3M Optical Systems of St. Paul, Minn., for example, provides a light-exiting surface having a multiplicity of prisms, each performing a double internal reflection wherein about half of the incoming rays are reflected back and recycled unless they can be output within a narrower exit cone, thereby providing a brightening effect for a particular set of viewing angles. Such BEF film however, does not provide a diffusing function, but instead, must necessarily be used with a separate diffusing member if such an additional function is desired.

As a modern alternative, volume-phase holograms may be recorded not only to scatter incident light to provide a diffusion function, but also to scatter such light in a directional manner in accordance a preferred range of viewing angles. U.S. Pat. No. 5,418,631 teaches the use of a volume hologram for use in an edge-lit application, and U.S. Pat. No. 5,471,327 teaches a hologram recorded to directionally diffuse light from an array of linear lamp segments.

One problem with the use of volume-phase material is that it is relatively expensive as compared to a surface-relief hologram, and highly controlled coherent laser exposure is required during the recording process. Moreover, in light-concentrating applications holographic surface-relief structure often out-perform volume-phase counterparts. The need remains, therefore, for a surface-relief type of material which provides both a light-diffusing function and light-concentration function which is highly directional yet economical to manufacture.

SUMMARY OF THE INVENTION

The present invention resides in an optical material capable of simultaneously performing both a light-diffusion and light-concentration function. In a preferred embodiment, the material comprises an optically transmissive film layer having a first surface to receive incident radiation and a second surface from which the radiation emerges in diffuse, yet concentrated form. According to a method aspect of the invention, the material is processed to produce a relief pattern on the second surface characterized in having a multitude of minute projections having axes and outwardly oriented distal ends. The geometry is such that a ray of light impinging upon the first surface at one of a variety of off-axis angles of incidence travels through the material and, upon entry into a projection, the likelihood is increased that it will emerge from the outer surface of the projection at an angle closer to the axis of that projection than if that projection were not present. The material is preferably in the form of a planar film, and the axes of the projections are preferably substantially perpendicular to the film, so that light entering the first surface over a first range of angles of incidence, will emerge from the second surface at a second, narrower range of angles more normal to the plane of the film.

The projections may be produced in accordance with various techniques, such as the use of microlithography, including e-beam lithography, or micromachining. In the preferred embodiment, however, the projections are formed by exposing a photoresist layer to record a holographically derived random speckle pattern characteristic of a diffuse but temporally coherent source. Such a technique results in the development of numerous, closely-spaced protrusions across the surface of the resist, which, in the preferred embodiment, are on the order of 5 to 50 $\mu$m in size. Upon processing, the resist is etched in the vicinity of each protrusion to form the more steeply sloped projections. In has been found that the angle of view of the output light decreases as these projections become increasingly pronounced.

DETAILED DESCRIPTION OF THE PREFERRED EMBODIMENT

This invention resides in an optical material which provides both a light diffusing function and a concentration of the diffused light to provide a narrower range of viewing angles and proportionately brighter transmission within that range. In the preferred embodiment, realization of such a material is achieved by exposing a photoresist layer to a random speckle pattern representative of a coherently illuminated diffuser, then processing the resist to etch the material depth to a level either directly or inversely related to the speckle intensity pattern (depending on the choice of either a positive or negative photoresist), causing the speckle pattern to develop into a plurality of outwardly projecting protrusions. Through proper control of the exposure and etching parameters of the photoresist layer, these projections may approximate steep-sided conical shapes, randomly distributed in size and spacing, which channel a large proportion of the output light into rays parallel, or more closely parallel, to the axes of these conical shapes.

Figure 1:
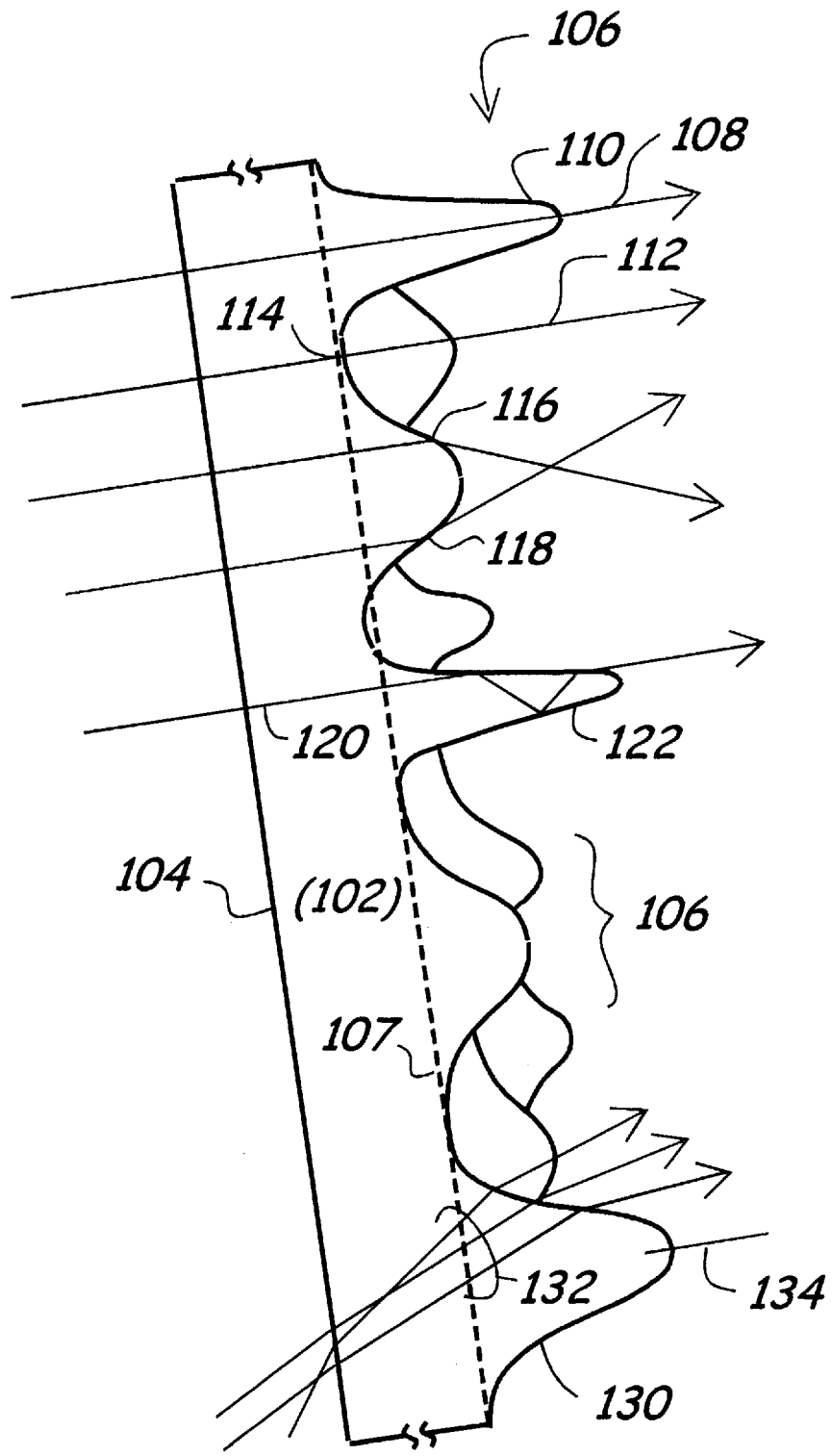
FIG. 1 is an oblique-view drawing of a structure formed in accordance with the invention having a multiplicity of minute projections which function to concentrate light diffused by the same material.

Such a phenomenon is depicted in FIG. 1. A layer of material 102 has a first side 104 to receive incident light from one or more sources of illumination, and an output side 106 from which the light emerges. In the embodiment shown, the input side 104 is substantially planar, whereas the output side 106 features a multiplicity of projections formed in accordance with the invention. As evident in FIG. 1, these projections extend outwardly from a plane 107 which is preferably parallel to the first side 104 of the layer 102. It should be apparent to those skilled in the art of optics that the physical features of the projections may depart from geometric precision yet provide the advantageous optical characteristics discussed herein.

The diffusing nature of the structure depicted in FIG. 1 may result from several mechanisms. First, the structure is microscopic; that is, the projections are preferably sufficiently small that they are not visible to naked eye. Secondly, the structure is characterized in having a random size/slope distribution, increasing the probability that different path configurations will be assumed by the incident rays. For example, as shown in the figure, a ray 108 may be conducted through the material 102 and enter close enough to the peak of a projection 110 so as to remain substantially unaffected during transmission. A similar situation may occur if a ray 112 accurately strikes a valley 114 between peaks. More typically, however, rays will enter into the material and exit at some point along the slope of a protrusion, for example, at points 116 and 118, resulting in different output angles. Alternatively, a ray 120 may undergo one or more internal reflections, as depicted within projection 122, resulting in a narrow output angle nearly perpendicular to the plane of the material 102. Such behavior is encouraged by this invention.

The incoming rays of light need not enter the plane of the material perpendicularly as just described, but, may enter at a variety of angles, as illustrated with respect to the projection 130. Such different incoming angles may be caused by a variety of factors, including the geometry of the illumination source and, if an incoming ray does not strike surface 104 perpendicularly, redirection of the light may occur in accordance with the index of refraction of the material 102. Depending upon the steepness of the projection, rays such as 132 may be bent toward the axis 134 of the cone, and hence, more collimated with respect to a viewer, or, if the projection is sufficiently steep, one or more internal reflections may take place as in the case of cone 122, again, resulting in a narrower output angle.

Figure 2:
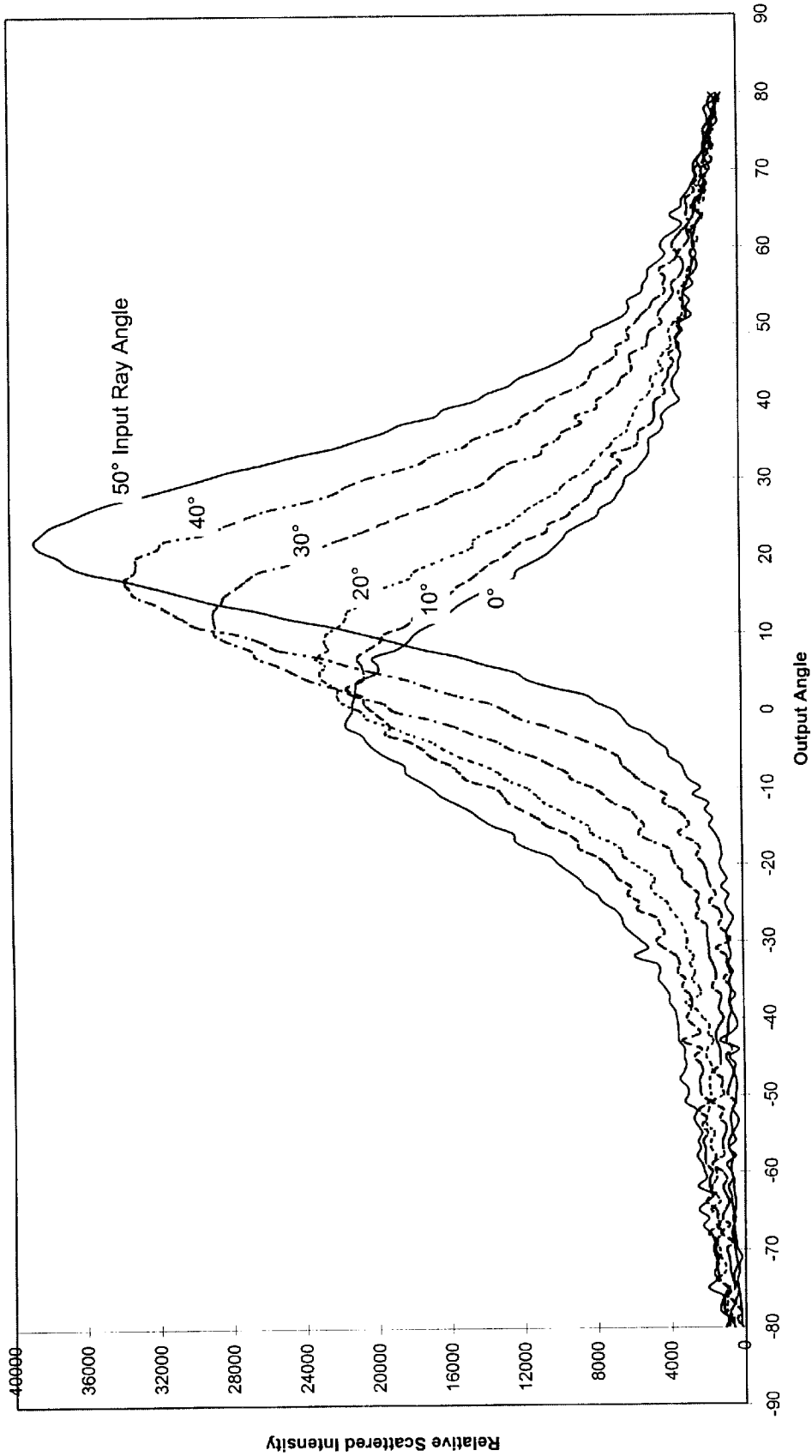
FIG. 2 is a series of plots which illustrates output angle as a function of input angle.

This behavior is illustrated by an experimental example depicted in FIG. 2, which shows how the angular output intensity profile moves as a collimated input beam is tilted away from the surface normal in 10° increments. The element under test is a holographic surface relief diffuser, replicated in clear acrylic, having the general physical configuration of FIG. 1 with random feature sizes on the order of 10 microns. The plots show that the diffuse output lobe stays much closer to the surface normal than the input ray. For example, when the input ray is at 50° to the surface normal, the resulting output lobe peaks at only about 22° to the surface normal. Thus, an input light distribution containing a very wide range of ray angles will be diffused into an output profile containing a narrower range of ray angles. Backscattering of the incident rays should be contained to a minimum if the angle of the cone is sufficiently deep. That is, if the cone is sharply acute in shape, nearly all of the incident light from the flat side 104 can propagate up the cone, achieving consecutively smaller angles with respect to the outer surface of the cone, until escaping total internal reflections and exiting with angles which nearly graze the outer surfaces of the cone walls, as shown, for instance, by light ray 120 in FIG. 1.

As mentioned, the projections may be formed by exposing a photoresist layer to a high-resolution coherent laser speckle pattern and chemically processing the exposed photoresist to etch a surface relief pattern corresponding to the speckle intensity pattern. Suitable photoresist materials are commercially available from such companies as Shipley, Inc. In practice, resist is uniformly applied to a glass substrate and treated to produce a master surface pattern for inexpensive replication. For example, metal deposition may be used to copy the structure onto a harder material for subsequent use in conjunction with a molding process controlled by pressure, temperature, and/or UV curing in an embossing replication scheme to empress duplicate film layers. Techniques used for such replication sequences are well known in the art, and duplication of a material produced according to this invention are not limited to known techniques or other mass production processes to be developed.

Figure 3:
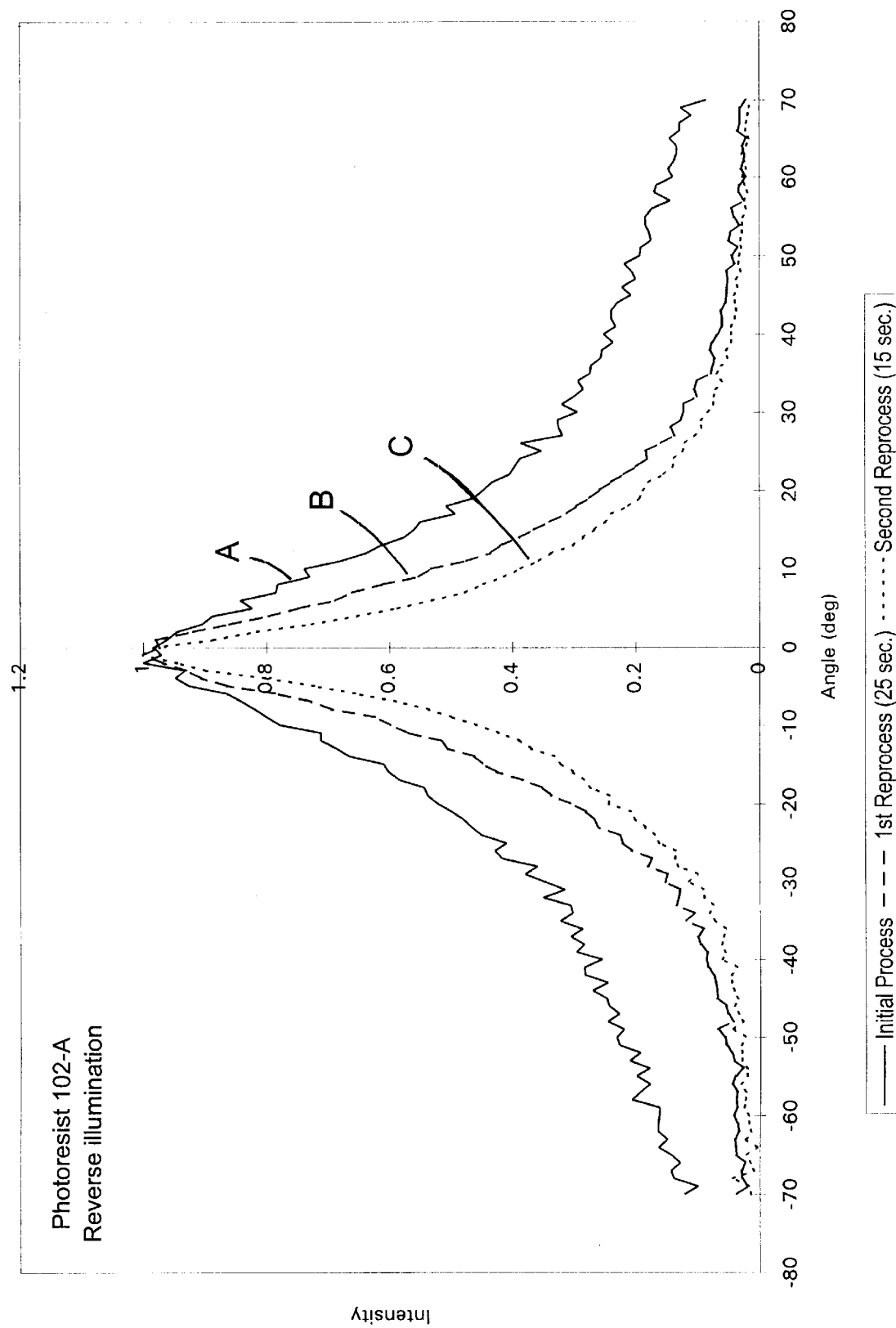
FIG. 3 is a plot of angular output versus intensity for a processed diffusing film exposed to collimated, normal incident light.

FIG. 3 illustrates the results of an experiment in which an existing photoresist surface-relief circular diffuser was processed to produce a deeper, steeper sided cone-like pattern resulting in a significantly narrowed angular output with respect to a collimated input. Curve A plots the intensity of the surface illumination used as a function of output angle, for a normal incident beam. As can be seen from the plot, at a normalized intensity value below roughly one third, the output angle broadens considerably, and even at angles of 70°, considerable intensity is present.

As shown in curve B, however, with a first reprocessing for greater depth, the range of angles is narrowed considerably, such that at angles in excess of ±30°, intensity is considerably attenuated. In curve C the profile of angle versus intensity following a second reprocessing for still greater depth, resulting in a somewhat sharper curve herein intensity values are further minimized, particularly at angles of ±30°.

Figure 4:
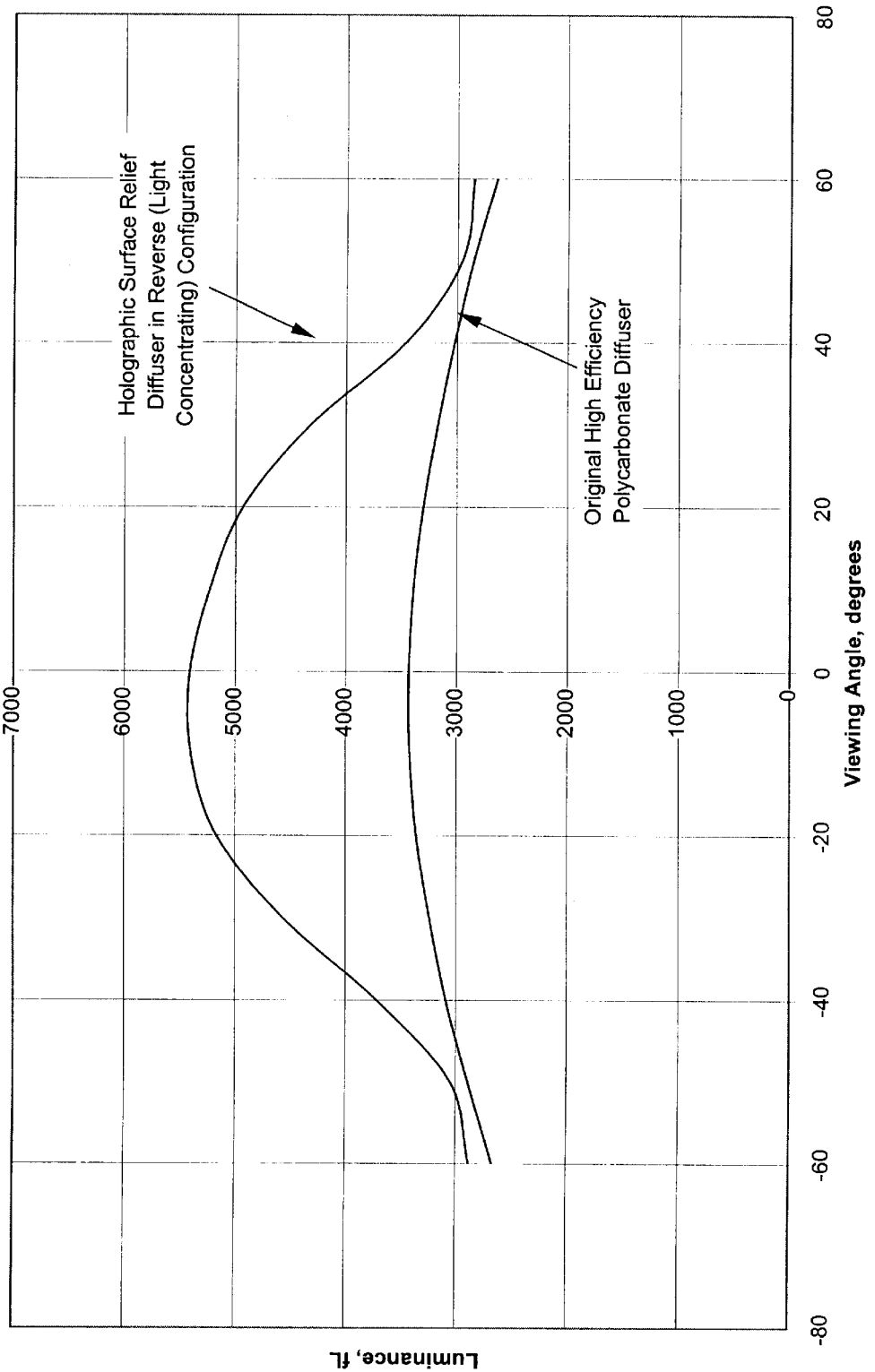
FIG. 4 is a plot illustrating gain made possible by the invention in an avionics display application.

Evaluations of replicated surface-relief diffusers have shown significant on-axis gain even without optimization for this effect, for example, by increasing the height and/or sharpening the angle of the side slope. When replacing conventional lambertial diffusers in backlight assemblies for high-luminance LCD displays, on-axis luminance has been shown to increase substantially as a result of these effects. FIG. 4 shows test results on a 7"×7" avionics backlight assembly, replacing its standard high-efficiency polycarbonate diffuser with a surface relief holographic diffuser having a circular angular profile in the light concentrating configuration. A nearly 60 percent on-axis luminance gain was demonstrated, as shown. Furthermore, the holographic diffuser demonstrated a better ability to hide the features of the serpentine lamp behind the diffuser, thus producing a more spatially uniform display luminance.

Figure 5:
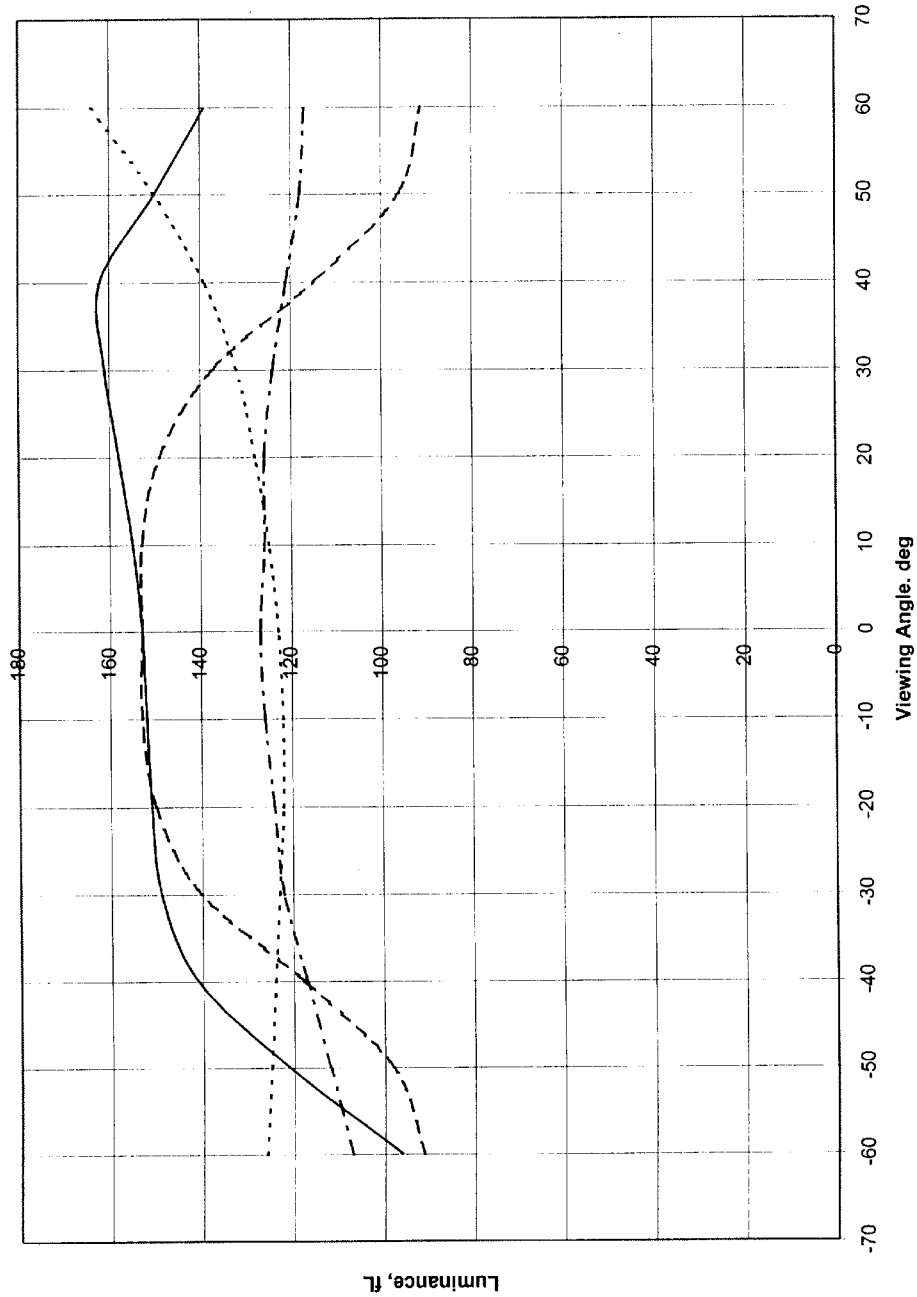
FIG. 5 is a plot of luminance versus viewing angle in a notebook computer backlight arrangement illustrating viewing-angle asymmetry.

In addition to symmetrical scattering about the axis of a particular projection, the pattern may also be tailored to provide asymmetric "collimation" in a particular viewing direction or plane. As one practical example, a wider horizontal view angle may be advantageous for use with certain types of display systems designed to accommodate multiple side-to-side viewers, such as in a two-seat aircraft This may be accommodated by the invention by exposing the photoresist plate to an asymmetric speckle pattern, such as would be generated by a coherently-illuminated, elongated slit, as described, for example, in U.S. Pat. No. 5,365,354. The elongated speckle intensity pattern results asymmetric protrusions resembling ellipsoids aligned along a common direction, in this case horizontal. The horizontally elongated protrusions will have a higher slope content in the vertical plane than in the horizontal plane, thus producing more angular concentration in the vertical plane than in the horizontal plane (where less concentration is desired in order to accommodate horizontally separated viewers). This effect is demonstrated in the test data of FIG. 5 using an elliptical profile diffuser on a notebook computer display backlight.

This asymmetric diffuser construction will also produce better lamp hiding power in the vertical plane than in the horizontal plane. Therefore, a compact and efficient lamp geometry would orient linear lamp elements (or linear segments of a serpentine lamp) horizontally, so as to allow the higher vertical diffusion angles to effectively fill in the horizontal light gaps between lamp elements as discussed in commonly assigned U.S. Pat. No. 5,471,327.

As mentioned, although in the preferred embodiment this relief pattern is mastered using holographic speckle recording, the effect may also be synthesized using other surface generating techniques such as e-beam or x-ray microlithography, very high resolution anisotropic etching, micromachining, and so forth.

Having thus described my invention, I claim:

1. A combined optical light diffuser and light concentrator, comprising:

a layer of optically transmissive material defining a plane, the plane having light-entering and light-exiting surfaces, the light-exiting surface including a relief pattern featuring a multiplicity of minute projections, each projection having a central axis which is substantially perpendicular to the plane and walls sloping up from a base region, the geometry being such that if a ray of light enters a projection through its base region at a first off-axis angle, the likelihood is enhanced that it will emerge from the projection at a second off-axis angle which is smaller than the first, the size and distribution of the projections being sufficiently random that the totality of light rays emerging the light-exiting surface characterizes diffuse light.

2. The optical light diffuser and concentrator of claim 1, wherein the relief pattern is formed by exposing a layer of photoresist to a random speckle pattern and processing the photoresist to achieve a relief pattern of projections having a random shape and distribution.

3. The optical light diffuser and concentrator of claim 2, wherein the relief pattern is replicated in a more durable form to function as master suitable for replication of the relief pattern.

4. The optical light diffuser and concentrator of claim 1, wherein the relief pattern is microlithographically formed.

5. The optical light diffuser and concentrator of claim 1, wherein the relief pattern is formed through micromachining.

* * * * *